Oct. 26, 1943.  W. E. MOFFITT  2,332,588
VARIABLE TRANSMISSION
Filed Oct. 7, 1940  3 Sheets-Sheet 1
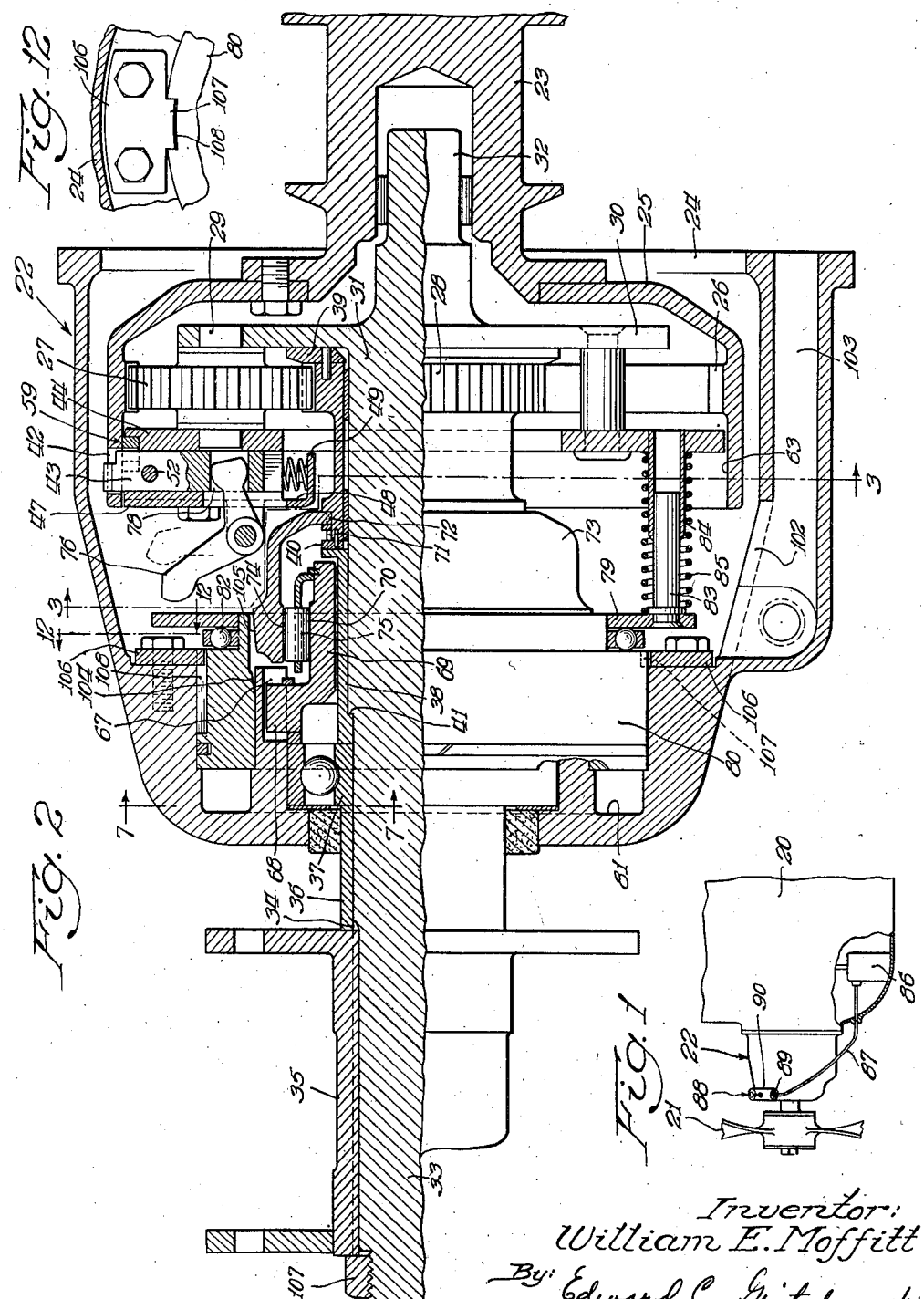
Inventor:
William E. Moffitt
By: Edward C. Gritzbaugh
Atty.

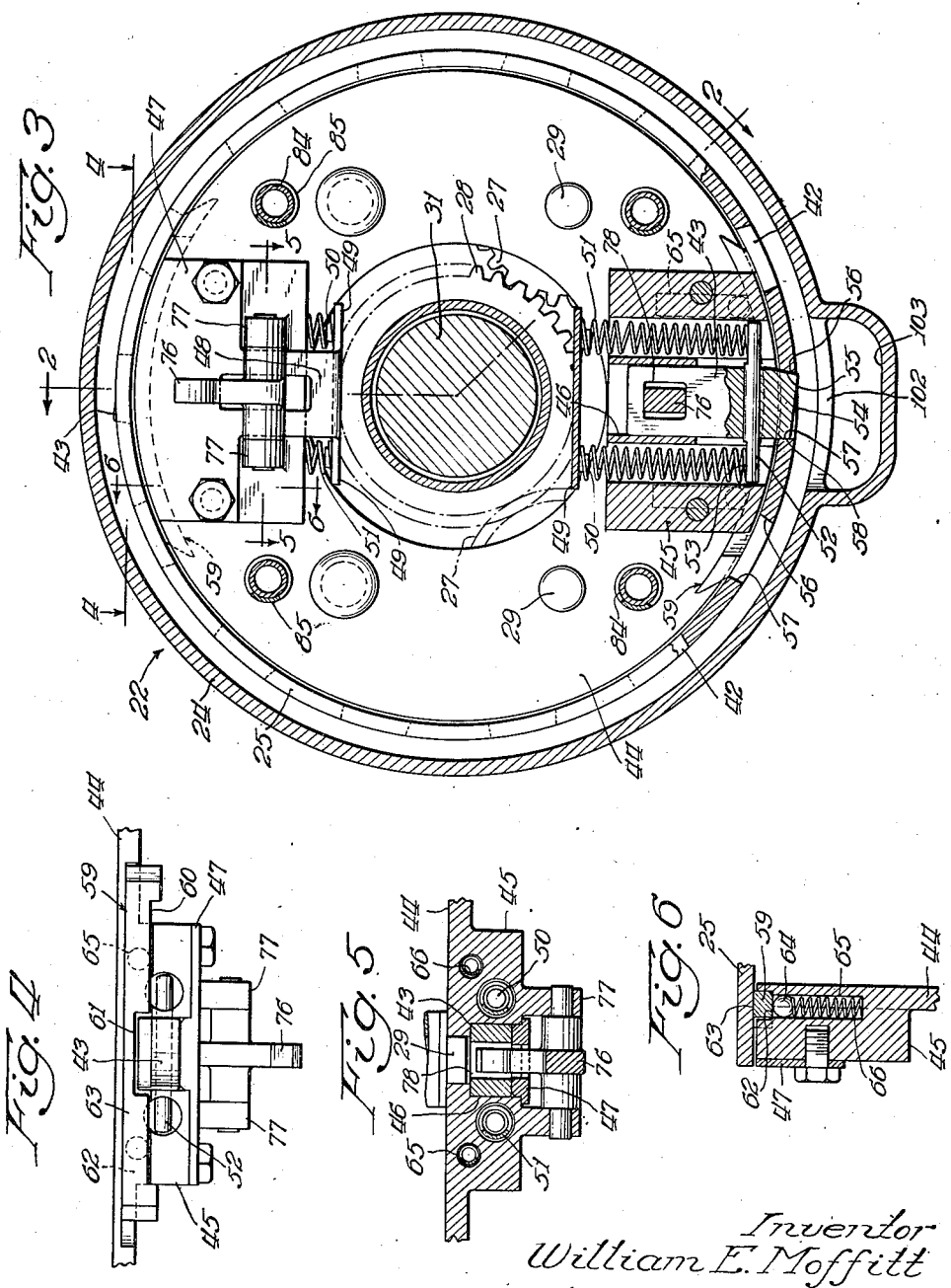

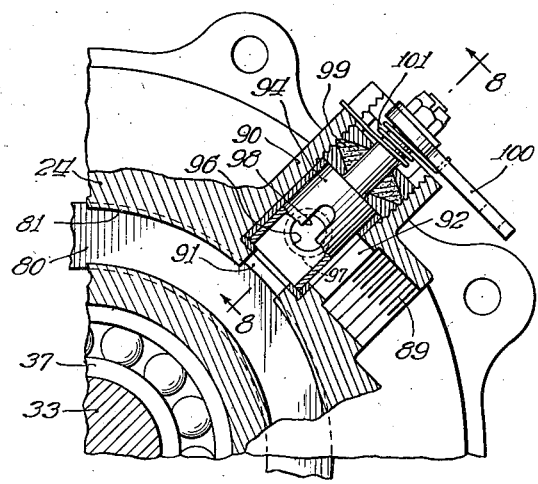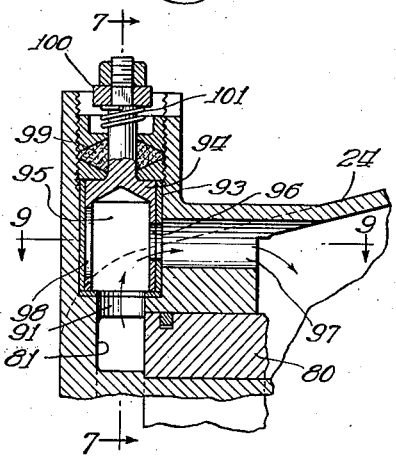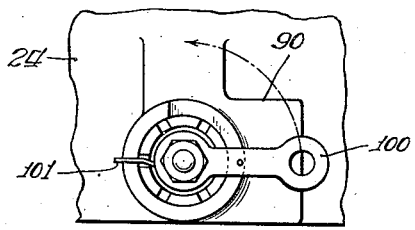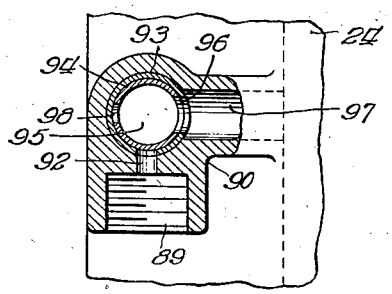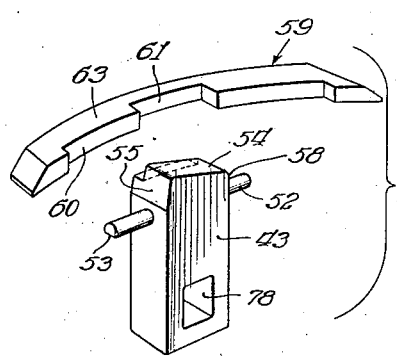

Patented Oct. 26, 1943

2,332,588

UNITED STATES PATENT OFFICE 2,332,588

VARIABLE TRANSMISSION

William E. Moffitt, Muncie, Ind., assignor to Borg-Warner Corporation, Chicago, Ill., a corporation of Illinois Application October 7, 1940, Serial No. 359,987

12 Claims. (Cl. 74—290)

This invention relates to variable speed transmissions, and particularly to such transmissions wherein a change from one speed to another may be effected without causing the driven shaft to be completely disconnected from the driving shaft for any substantial time interval.

For purposes of illustration this invention will be described with reference to a transmission which is to be used in connection with an airplane engine. Such engines are not provided with fly-wheels, but are dependent upon the associate propeller for supplying the necessary fly-wheel action. It is imperative in such cases that there be a connection between the propeller and engine shaft at all times to avoid stalling the engine or the "wind-milling" of the propeller.

It is well known that with a constant pitch propeller, an airplane equipped with a light engine must be provided with considerable wing area in order that the low power developed by the engine may be sufficient to lift the plane off the ground. This is due to the fact that the engine is so loaded at the start by the propeller that it cannot rotate at the speed at which it develops maximum horse power. An airplane with a large wing area, however, cannot travel at a very high speed when it levels off in the air, because of the resistance or drag of the large wings. In order to make a light engine suffice in a plane with relatively smaller wing area, it is necessary to alter the speed ratio between the engine and propeller so that the engine will be permitted to rotate at a higher speed than the propeller at the take-off and thus develop its maximum power. It is accordingly an object of this invention to provide an improved speed-reducing transmission, which does not allow the driven shaft to be completely disconnected from the driving shaft for any appreciable time, thus rendering it suitable for use in an airplane.

Another object of this invention is to provide a variable transmission wherein the drive in direct is a positive drive.

Another object of this invention is to provide a transmission of the variable speed type, wherein an improved positive clutch is used, which eliminates back-lash, thereby eliminating hammering action upon the driven clutch element which is caused by excessive vibration in the driving element.

Another object of this invention is to provide improved controls for a variable speed transmission, which are such that the release of one clutching element automatically and immediately causes the drive to be transmitted positively through another ratio.

These and other objects and features of this invention will become apparent in the following description.

The accompanying drawings form a part of the description, and illustrate the various features of the invention as follows:

Fig. 1 is a fragmentary side elevation of an engine and propeller and interconnecting improved transmission;

Fig. 2 is a side elevation in section of the transmission;

Fig. 3 is a front elevation partly in section of the transmission, taken along the line 3—3 of Fig. 2;

Fig. 4 is a plan view of one of the clutch elements of the transmission, the view being taken along line 4—4 of Fig. 3;

Fig. 5 is a section through the clutch element of Fig. 4, taken along line 5—5 of Fig. 3;

Fig. 6 is a section through a portion of the clutch element of Fig. 4, taken along line 6—6 of Fig. 3;

Fig. 7 is a fragmentary elevation partly in section of the transmission, showing the details of the control valve for the mechanism;

Fig. 8 is a fragmentary side elevation of the control valve of Fig. 7, taken along the line 8—8 of Fig. 7;

Fig. 9 is a section through the valve and associated housing of Fig. 7, taken along the line 9—9 of Fig. 8;

Fig. 10 is a fragmentary view of the exterior of the casing showing the control for the valve;

Fig. 11 is an exploded view of two of the elements of the clutch of Fig. 4; and

Fig. 12 is a fragmentary rear elevation of a portion of the clutch operating mechanism, taken along the line 12—12 of Fig. 2.

The invention may be described briefly as a two-speed transmission, wherein a positive clutch of the dog type is provided to connect the driving and driven shafts together for direct drive, and wherein suitable gearing is provided which, with the assistance of a roller and cam device, is effective to transmit the torque at a reduced speed when the positive clutch is disconnected. The positive clutch is of the self-synchronizing type, and is provided with means for preventing the engagement of the interfitting parts except when a reversal of torque takes place. The dogs are normally resiliently biased to engaged position, and are disengaged by a fluid operated motor. A novel coaction is provided between the fluid motor and the roller and cam device, whereby radial thrust produced by the rollers is taken by the fluid motor, and at the same time the rotation of one of the gears in the gear set is arrested.

Referring to the drawings now for a detailed description of the invention, and particularly to Figs. 1 and 2, 20 represents a gasoline engine which may be one of those falling into the classification of "light engines," that is a 4-cylinder engine or the equivalent, developing in the neighborhood of 50 horse-power. I wish it clearly understood, however, that the invention is not limited to engines of this size, but can be used to advantage with practically any aircraft engine, the "light engines" being used here merely for purpose of illustration. A propeller 21 of the fixed pitch type is to be driven by engine 20, and the improved variable speed transmission 22 is inserted between engine 20 and propeller 21 to provide a low ratio and a direct drive for propeller 21. Transmission 22 is bolted directly upon engine 20 and is of rather small diameter so that it can be made to fit conveniently within the cowling usually provided for airplane engines.

The transmission 22 is shown in greater detail in Fig. 2 to which attention is now directed. Engine shaft 23 projects into housing 24 of transmission 22 and is bolted to a drum 25, a portion of which is formed with internal teeth to constitute a ring gear 26. Meshing with ring gear 26 are three planet gears 27 which, in turn, mesh with a centrally located sun gear 28. Planet gears 27 are mounted upon axles 29 which are supported upon a carrier flange 30 integral with a driven shaft 31. Said shaft 31 is piloted at its right-hand end 32 (Fig. 2) in engine shaft 23 and extends outwardly in the opposite direction through the transmission, its extending end 33 being provided with long splines 34 upon which is keyed a propeller hub 35.

It may be stated at this point that since airplane engines are made as light as possible and are therefore supplied with less fly-wheel mass than might be desirable for a smooth flow of power, the impulses imparted to driven shaft 31 through carrier 30 are considerable. For this reason, carrier 30 and driven shaft 31 are made as a single forging thereby eliminating the splined connection between the carrier and shaft and the possibility of a failure of the spline by reason of the excessive hammer of the engine.

It will be apparent that if carrier 30 and drum 25 are connected together non-rotatably a direct drive is effected between drive shaft 23 and driven shaft 31. On the other hand, if sun gear 28 is held against rotation and the rigid connection between drum 25 and carrier 30 is broken, driven shaft 31 will rotate at a reduced speed with respect to engine shaft 23 thereby permitting the engine to rotate at a higher speed than the propeller.

Sun gear 28 is in the form of a collar which is freely rotatable on driven shaft 31. Between sun gear 28 and propeller hub 35 are spacer sleeve 36, ball race 37, and another spacer sleeve 38. A thrust washer 39 is pinned to the right-hand end (Fig. 2) of sun gear 28 and serves to maintain a proper spacing between carrier 30 and the sun gear. A second thrust washer 40 is pinned to the opposite end of the sun gear and serves to limit movement of the sun gear toward the propeller. Spacer 38 is provided with a shoulder 41 which abuts a stepped portion of driven shaft 31 and takes the reaction of nut 107 on the end of driven shaft 31. A single nut therefore serves to hold the propeller hub and sun gear in their proper places on driven shaft 31.

The positive means for locking the drive shaft to the driven shaft is of the radially movable dog and windowed drum type. Drum 25 is thus provided with substantially rectangular windows 42 which are axially aligned with radially movable dogs 43. Said dogs 43 are supported on, and rotatable with, an annular plate 44 which is riveted to carrier 30 and forms a part thereof. The details of construction of the dogs are more clearly shown in Figs. 3 to 6 and 11, to which figures reference is now made.

Dogs 43 are in the form of rectangular blocks of steel which are radially disposed on plate 44 and are adapted to move radially outward to extend into the axially aligned windows 42 on drum 25. The dogs are located in lugs 45 which may be integral with plate 44, the lugs being provided with radial slots 46 in which the dogs are received. A cover plate 47 is bolted to lugs 45 and prevents dogs 43 from moving axially out of slots 46. Each plate 47 is provided with a radially inwardly extending tongue 48 the inner end of which is bent to form a pair of ears 49 positioned in a plane at right angles with the axis of the associated dog. To ears 49 are fastened cylindrical projections 50 which serve to center a pair of dog-actuating compression springs 51.

The outer region of each dog 43 is pierced by a tightly fitting pin 52 which extends symmetrically from the sides of the dog. The extended ends of the pin have their inner surfaces flattened to provide bearing surfaces 53 for the opposite ends of compression springs 51. Thus each dog 43 is continuously biased radially outwardly toward windows 42 in drum 25 by springs 51. This is true whether or not the carrier 30 is rotating so that the radial movement of the dogs is not dependent upon centrifugal force.

In order to prevent the abrupt engagement of a dog with a window the outer surface 54 of each dog is chamfered so that the dog will merely tend to ratchet over the windows until the dogs and windows rotate at the same speed, whereupon a slight relative movement between the dogs and windows will cause the dogs to enter the nearest windows and effect a connection between the drum 25 and carrier 30.

It was stated previously that due to the low mass of the driven elements associated with the engine and the low number of cylinders generally used in light engines the vibrations occasioned by the firing of the cylinders are very great. In a positive clutch of the type described, excessive vibration results in a hammering action upon the driven elements because of the unavoidable back-lash which exists between the clutching elements. This hammering action causes the driving faces of the clutch elements to wear very rapidly and in certain cases to crystallize and break. To avoid the excessive wear on the cooperating clutch elements, the dogs and windows in the present improved transmission are provided with cooperating oblique surfaces which cause the dogs to engage the windows with a wedging action. The oblique surface on the dog is shown at 55 and the cooperating oblique surface on the window is shown at 56. These surfaces are the trailing surfaces, the driving surfaces 57 and 58 on the dog and window respectively being substantially parallel to the axis of the dog so that the driving force will not have any tendency to withdraw the dog from the window when it is intended to be engaged. The driving action will of course be transmitted to the opposite oblique surfaces to some extent, but due to the peripheral spacing between the driving and oblique surfaces, the line of thrust will be substantially normal to the oblique surfaces. This of course is true only to a limited extent and some radially inwardly component of force will be present. The angle of the oblique surfaces however, is so chosen that the force of friction will be ample to offset any radially inward component that might exist.

To avoid any unpleasant ratcheting that might occur during the interval when dogs 43 are rotating relative to windows 42, a blocker is provided for each dog which maintains the dog in withdrawn position until a slight reversal in torque takes place between the dogs and windows whereupon the blocking element is moved out of the way and dogs 43 then spring into the nearest windows. The blocking element is in the form of a segment 59 of a ring (Fig. 11) having a relatively wide slot 60 on one side thereof and a narrower slot 61 within slot 60. Slot 61 is wide enough to accommodate the outer end of dog 43, and slot 60 is slightly wider than lug 45 on carrier plate 44. Said segment 59 is disposed between drum 25 and the outer surface of lug 45, the latter being provided with a groove 62 to receive the blocker segment. Groove 62 is just wide enough to accommodate the portion of segment 59 included within the walls of slot 60 so that the extremities of segments 59 are too wide to enter groove 62. Since slot 60 is slightly wider than lug 45, segment 59 is free to move through a small distance relative to lug 45. This provides the segment with at least two positions that it may assume relative to the lugs. In one of the positions inner slot 61 is aligned with dog 43 and offers no obstacle to the outward movement of the dog. In the other position, slot 61 is not aligned with dog 43 and accordingly the dog cannot move past the blocker to engage drum 25.

The relative movement between segment 59 and lug 45 is provided by the force of friction between outer surface 63 on the segment and the inner surface of drum 25. This force of friction is augmented by means of balls 64 located in drilled openings 65 in lugs 45 and pressed radially outward by compression springs 66.

The operation of the blocker is as follows: When dogs 43 are withdrawn and relative movement exists between drum 25 and carrier plate 44, the force of friction between segment 59 and drum 25 will cause the segment to move peripherally relative to lug 45 a distance permitted by the length of slot 60. This peripheral movement is sufficient to cause slot 61 to move over out of registry with dog 43 and thereby effecting a blocking of the radial movement of the dog. When the power is shut off or reduced so that drum 25 tends to slow down, the momentum of the load on the driven shaft will cause the carrier and its associated lugs 45 to slow down less quickly so that a point is reached where drum 25 begins to rotate at a lesser speed than lug 45. At this point there is a relative reversal of torque between the drum 25 and lug 45 which tends to move segment 59 in the opposite direction. Just as soon as it has moved in the opposite direction sufficiently to uncover dog 43, the latter will be freed and will move into engagement with one of the windows.

The means for arresting the rotation of sun gear 28 to establish a reduced drive is a one-way brake which is shown in Fig. 2. Casing 24 is provided at its forward and inner end with a plurality of internal teeth 67 which engage external teeth 68 on a collar 69. Said collar 69 is provided with cam surfaces 70 which are similar to those found in a roller type of one-way clutch. The forward end of sun gear 28 is formed with external splines 71 with which are engaged internal splines 72 of a drum 73. Said drum 73 overhangs collar 69 and is provided at its extremity with a friction surface 74 spaced from cams 70. Between the cam surfaces 70 and friction surface 74 are located a plurality of rollers 75.

The direction of inclination of cam surfaces 70 is such that drum 73 and its connected sun gear 28 cannot rotate reversely with relation to drive shaft 23, but can rotate in the same direction as the drive shaft.

The releasing means for the direct drive or lock-up clutch will now be described. It will be remembered that dogs 43 are normally biased to engaged position by springs 51, and therefore no engaging means is necessary for the clutch. To disengage the clutch it is necessary to overcome not only the force of engaging spring 51 but also several other forces such as centrifugal force, the force of friction between the oblique surfaces 55 and 56 and the torque load that might exist at the instant of release. Such a releasing force is necessarily rather large, and accordingly power means are used to effect the release of the clutch.

The radially inwardly movement of dogs 43 to effect a release is secured by means of bell cranks 76 which are pivotally mounted on ears 77 on lugs 45. Dogs 43 are provided with apertures 78 near the lower ends thereof into which one arm of bell crank 76 extends. The other arm of bell crank 76 is adapted to be engaged by an annular plate 79 which is spaced axially from carrier plate 44. On the opposite side of plate 79 from bell crank 76 is an annular piston 80 which is movable axially toward plate 79 by fluid pressure in chamber 81. Between piston 80 and plate 79 is a ball thrust bearing 82. Thus, when it is desired to release the direct drive clutch, fluid under pressure is admitted to chamber 81 to cause piston 80 to move to the right (Fig. 2). This movement causes plate 79 to move toward bell crank 76 and eventually causes said crank to rotate in a clockwise direction. The arm of bell crank 76 which engages dog 43 will then be moved in such a manner as to withdraw dog 43 from windowed drum 25 and release the clutch.

Plate 79 is supported from plate 44 by means of a telescoping connection comprised of a pin 83 secured to plate 79 and projecting into a tube 84 secured to plate 44. A compression spring 85 serves to maintain plate 79 against bearing 82. Spring 85 also serves to eliminate rattles between the plate 79, bearing 82 and piston 80. Thus, although power is required to move plate 79 in one direction, it is returned automatically by springs 85 to a released position. Furthermore, the pressure of springs 85 is transmitted to piston 80 and assists in forcing the fluid in chamber 81 outward when it is desired to release the direct drive clutch.

The fluid is controlled by the mechanism shown in Figs. 1, 7, 8, 9 and 10. In the apparatus disclosed, the fluid is taken from the lubricating oil system of the engine 20 by means of a pump 86 driven by engine 20, the pump and driving means therefor being shown diagrammatically. The oil under pressure is conducted through a tube 87 to a valve 88 located near piston 80. In Figs. 7, 9 and 10 is shown a tapped opening 89 into which tube 87 is fastened by means of a suitable fitting (not shown).

The valve is comprised of a lug 90 which is a part of casing 24 and which is hollowed to provide a passage-way 91 to chamber 81. Passage-way 91 is expanded in the space between an inlet passage-way 92 communicating with tube 87 and lined with a cylindrical liner 93. A cylindrical valve 94 is inserted in liner 93 and controls the flow of oil into and out of chamber 81. Said valve 94 is provided with a chamber 95 which is always in communication with passage-way 91 leading into cylinder 81. A side opening 96, when in registry with an outlet passage 97, permits the fluid to escape from chamber 81 to relieve the pressure behind piston 80. Another side opening 98, when in registry with inlet passage-way 92, causes chamber 81 to be in communication with tube 87 containing the oil under pressure. Side openings 96 and 98 are so arranged that when one is in registry with its passage-way, the other passage-way is blocked off. Suitable packing means 99 are provided to prevent an oil leak past the valve. The valve is controlled by an arm 100 which may be connected by means of a Bowden wire (not shown) to the instrument panel of the airplane. A spring 101 always maintains the valve in its released position, that is, in the position in which oil from chamber 81 is vented through passage-way 97 to casing 24.

Excess oil is returned to engine 20 through an aperture 102 at the bottom of casing 24 and a passage-way 103 which connects aperture 102 with the oil reservoir in engine 20.

It will be noted that because of the bell shape of drum 73 which serves to stop the rotation of sun gear 28, the radial force exerted by rollers 75 upon friction surface 74 may tend to expand the drum to a considerable extent. A feature of this invention contemplates providing a support for drum 73 by which the radial reaction of rollers 75 is taken. The means for accomplishing this result comprise conical friction surfaces 104 and 105 on piston 80 and drum 73, respectively, which are engaged when piston 80 is moved to the right (Fig. 2) to disengage dogs 43 from windowed drum 25. A plate 106 (Fig. 12) is rigidly secured to casing 24 and is provided with keys 107 which fit into slots 108 in piston 80.

In addition to providing additional support for the radial thrust imposed by rollers 75, cooperating surfaces 104 and 105 also constitute a brake for arresting the rotation of sun gear 28.

Although the operation of the several portions of the transmission have been decribed briefly elsewhere in the specification, the operation of the transmission as a whole will now be detailed. It is apparent that the transmission is essentially a variable speed transmission which in the illustration given hereinabove comprises a direct drive and a reduced drive. Valve 94 is normally set to release the pressure behind piston 80 and thereby permit dogs 43 to engage windows 42. The direct drive clutch will normally be engaged and drive shaft 23 will drive driven shaft 31 and its associated propeller hub 35 and propeller 21 at the same speed. When a reduced speed is desired, as for example when taking off, the pilot rotates valve 94 through 90°, thereby cutting off communication with outlet passage 97 and connecting the oil pressure tube 87 with chamber 81. This causes piston 80 to move to the right (Fig. 2), thereby moving annular plate 79 with it against the action of springs 85 until plate 79 strikes bell crank 76. Further movement in the same direction causes bell crank 76 to rotate about its pivot, withdrawing dogs 43 from their windows 42 against the action of engaging springs 51. The instant that dogs 43 are no longer in contact with drums 25 the load on driven shaft 31 causes the shaft and its associated carrier 30 and planet pinions 27 to rotate more slowly than drive shaft 23, whereupon sun gear 28 will tend to rotate still more slowly and may even stop and rotate in a reverse direction. The rotation of sun gear 28, however, will be arrested by brake surfaces 104 and 105 and further slowing up of driven shaft 31 will then cause sun gear 28 definitely to tend to rotate in a reverse direction. This reverse rotation, however, cannot take place because of the action of one-way brake 74, 75 which holds sun gear 28. With sun gear 28 held stationary, planet pinions 27 will drive carrier 30 and its associated shaft 31 at a reduced speed with respect to drive shaft 23. This condition will obtain as long as valve 88 is conditioned for reduced speed drive. When direct drive is to be resumed, the valve is released and its spring 101 will restore it to its normal position, that is, the position wherein chamber 81 is vented and pressure is removed from bell crank 76. As soon as pressure is relieved from behind piston 80, springs 85 will immediately force the piston back to the left (Fig. 2), thereby allowing bell crank 76 to rotate in a counter-clockwise direction. Springs 51, which are always active, will then urge dogs 43 radially outwardly toward the windows 42 in drum 25. At such time, however, the drum is rotating faster than the carrier and blocker segments 69 will be moved over to a position where notch 61 is not in registry with dog 43, in this manner preventing the engagement of dogs 43 with windows 42. At this point the engine will be slowed down by releasing the throttle while the propeller, driven shaft 31 and carrier 30 will tend to rotate at substantially the same speed. When the speed of the drum falls slightly below the speed of the carrier 30 so that there is a relative reversal of torque between the two, blocker segments 69 will be moved in the opposite direction to align notch 61 with dog 43, whereupon the outward radial movement of the dogs will be completed and the dogs will engage their respective windows 42 in the drum to establish direct drive between drive shaft 23 and driven shaft 31.

While operating in direct drive, the wedge fit effected by sloping surface 55 will prevent the dogs from rattling and becoming worn out prematurely through the constant hammer against the drum.

It will be noted that brake surfaces 104, 105 not only arrest the rotation of sun gear 28 just prior to the resumption of drive through the reduced ratio but they also perform the important function of taking the coast load of the propeller so that the latter will not be completely disconnected from the engine. The coast load tends to rotate sun gear 28 in a forward direction off the rollers 75, and if this forward reaction were not taken by friction surfaces 104, 105, the propeller and engine would be disconnected, thus depriving the engine of a flywheel and allowing the propeller to "windmill" freely. The coast load is not as large as the power load and hence may be taken by a friction brake.

It is understood that the foregoing description is merely illustrative of a preferred embodiment of the invention and that the scope of the invention, therefore, is not to be limited thereto but is to be determined by the appended claims.

I claim:

1. A transmission comprising a drive shaft, a driven shaft, a drive gear driven by the drive shaft, a gear drivingly connected to the driven shaft and adapted to be driven from the drive gear, means associated with the driven gear for providing a fulcrum for torque multiplication, positive locking means for connecting the driving and driven shafts for rotation in unison, said last-mentioned means being continuously biased to operative position, and means on said positive locking means for preventing the operation of said locking means until the driving and driven shafts are rotating at substantially the same speed.

2. A transmission comprising a drive shaft, a driven shaft, a drive gear driven by the drive shaft, a gear drivingly connected to the driven shaft and adapted to be driven from the drive gear, means associated with the driven gear for providing a fulcrum for torque multiplication, positive locking means for connecting the driving and driven shafts for rotation at the same speed, resilient means biasing the last-mentioned means to locking position and means on the locking means for preventing the operation of said locking means until the driving and driven shafts are rotating at the same speed.

3. A transmission comprising a drive shaft, a driven shaft, a drive gear driven by the drive shaft, a gear drivingly connected to the driven shaft and adapted to be driven from the drive gear, means associated with the driven gear for providing a fulcrum for torque multiplication, positive locking means for connecting the driving and driven shafts for rotation at the same speed, said last-mentioned means being continuously potentially operative, means associated with said first and second means whereby said first-mentioned means is permitted automatically to operate when the second-mentioned means is rendered inoperative, and means on the last-mentioned means cooperatively related with the first mentioned means to assist in providing the fulcrum for torque multiplication.

4. A transmission comprising a drive shaft, a driven shaft, a drive gear driven by the drive shaft, a gear drivingly connected to the driven shaft and adapted to be driven from the drive gear, means associated with the driven gear for providing a fulcrum for torque multiplication; a clutch comprising a windowed drum driven by the drive gear, a radially operative dog drivingly connected to the driven shaft and adapted to enter a window of the drum to effect engagement of the clutch, an axially movable power operated means, and a pivoted link cooperating with the power operated means and dog to withdraw the dog from the window in the drum thereby to release the clutch, said fulcrum-providing means being automatically rendered operative upon the release of said clutch.

5. A transmission comprising a drive shaft, a driven shaft, a ring gear connected to the drive shaft, a sun gear, planet pinions meshing with the ring and sun gears, a carrier for the planet pinions connected to the driven shaft, clutch means for directly connecting the driving and driven shafts together, power means for controlling the clutch, and means associated with the power means and sun gear to arrest the rotation of the sun gear when the power means is operated.

6. A transmission comprising a drive shaft, a driven shaft, a ring gear connected to the drive shaft, a sun gear, planet pinions meshing with the ring and sun gears, a carrier for the planet pinions connected to the driven shaft, clutch means for connecting the driving and driven shafts, roller and cam means connected to the sun gear for preventing reverse rotation of the sun gear to provide a different speed ratio between the drive and driven shafts, power means for controlling the clutch, and means associated with the power means and roller and cam means for taking the reaction of the rollers when the sun gear tends to rotate reversely.

7. A transmission comprising driving and driven shafts, gearing connecting said shafts to alter the speed ratio therebetween, a clutch for connecting the shafts for direct drive, said clutch comprising a windowed drum driven by the drive shaft, radially movable dogs adapted to extend into the windows, a support for the dogs rotatable with the driven shaft, an annular plate axially spaced from the dogs, power means movable axially and adapted to move the plate toward the dogs, an axially telescoping support for the plate mounted on the rotatable dog support, resilient means continuously urging the plate toward the power means, resilient means continuously urging the dogs radially outwardly, and pivoted levers mounted on the rotatable dog support and adapted to engage the dogs and plate to withdraw the dogs from the windows when the power means is actuated.

8. A transmission as described in claim 7, said gearing comprising a ring gear connected to the drive shaft, a sun gear, planet pinions meshing with the sun and ring gears, a planet pinion carrier connected to the driven shaft, and a one-way brake for preventing reverse rotation of the sun gear.

9. A transmission as described in claim 7, said power means comprising a casing having an annular chamber, an axially movable piston in the chamber, a source of oil under pressure, and a manually controlled valve for admitting the oil under pressure into the chamber and for venting said chamber.

10. A transmission as described in claim 7, said gear comprising a ring gear connected to the drive shaft, a sun gear, planet pinions meshing with the sun and ring gears, a planet pinion carrier connected to the driven shaft, and a cam and roller brake for preventing reverse rotation of the sun gear, said power means comprising a casing having an annular chamber, an axially movable piston in the chamber, a source of oil under pressure, and a manually controlled valve for controlling the oil pressure in the chamber; and friction means on the piston and one-way brake for assisting in arresting the rotation of the sun gear and also serving to take the radial reaction of the rollers on the cams.

11. A transmission comprising a drive shaft, a driven shaft, a drive gear driven by the drive shaft, a gear drivingly connected to the driven shaft and adapted to be driven from the drive gear, means associated with the driven gear for providing a fulcrum for torque multiplication to establish a connection between the driving and driven shafts at one ratio, positive locking means for establishing a connection between the driving and driven shafts at a different ratio, said last-mentioned means being continuously biased to operative position, and means on said positive locking means for preventing the operation of said locking means until the driving and driven shafts are rotating at substantially the different ratio.

12. A transmission comprising a drive shaft, a driven shaft, a drive gear driven by the drive shaft, a gear drivingly connected to the driven shaft and adapted to be driven from the drive gear, means associated with the driven gear for providing a fulcrum for torque multiplication to establish a connection between the driving and driven shafts at one ratio, positive locking means for establishing a connection between the driving and driven shafts at a different ratio, resilient means biasing the locking means to locking position, and means on said positive locking means for preventing the operation of said locking means until the driving and driven shafts are rotating at substantially the different ratio.

WILLIAM E. MOFFITT.